United States Patent
Gebel

[15] 3,652,154
[45] Mar. 28, 1972

[54] LIGHT CONTROL SYSTEM FOR USE IN VERY LOW LIGHT INTENSITIES

[72] Inventor: Radames K. H. Gebel, Dayton, Ohio
[73] Assignee: The United States of America as represented by the Secretary of the Air Force
[22] Filed: Aug. 7, 1970
[21] Appl. No.: 61,890

[52] U.S. Cl. .................... 352/141, 250/214 P, 250/213 VT, 352/180, 178/DIG. 29
[51] Int. Cl. .................................................. G03b 7/08
[58] Field of Search .............. 250/213 VT, 206, 229, 214 P, 250/214 R; 95/10 CD, 10 C, 64 D, 64 R; 178/6.8, 7.2, DIG. 28, DIG. 29; 352/141, 180

[56] References Cited

UNITED STATES PATENTS

| | | | |
|---|---|---|---|
| 2,885,563 | 5/1959 | Batina et al. | 250/214 P |
| 3,580,157 | 3/1969 | Casebeer | 250/229 |
| 2,927,215 | 3/1960 | Allen et al. | 250/213 X |
| 3,333,058 | 7/1967 | Goldmark et al. | 178/DIG. 28 |

OTHER PUBLICATIONS

Beyer et al.: An Optically Scanned Sec Camera Tube; Advances in Electronics and Electron Physics; Vol. 22A; 1966; pp. 241– 250

Primary Examiner—Walter Stolwein
Attorney—Harry A. Herbert, Jr. and Robert Kern Duncan

[57] ABSTRACT

A high sensitivity light control system for providing relatively constant effective values of light intensity to photographic devices operating in very low levels of light intensity is provided by using the signal derived by integrating, amplifying, and smoothing the output of a periodically readout storage light detector tube to control a mechanical aperture, scanning frame time, or light gain in a variable gain image intensifier stage. Light intensities from the scene photographically viewed are detected and integrated temporally in the storage light detector tube, integrating the output of the storage light detector provides spatial integration of the temporally integrated light intensity over the scene viewed.

8 Claims, 18 Drawing Figures

INVENTOR.
RADAMES K. H. GEBEL

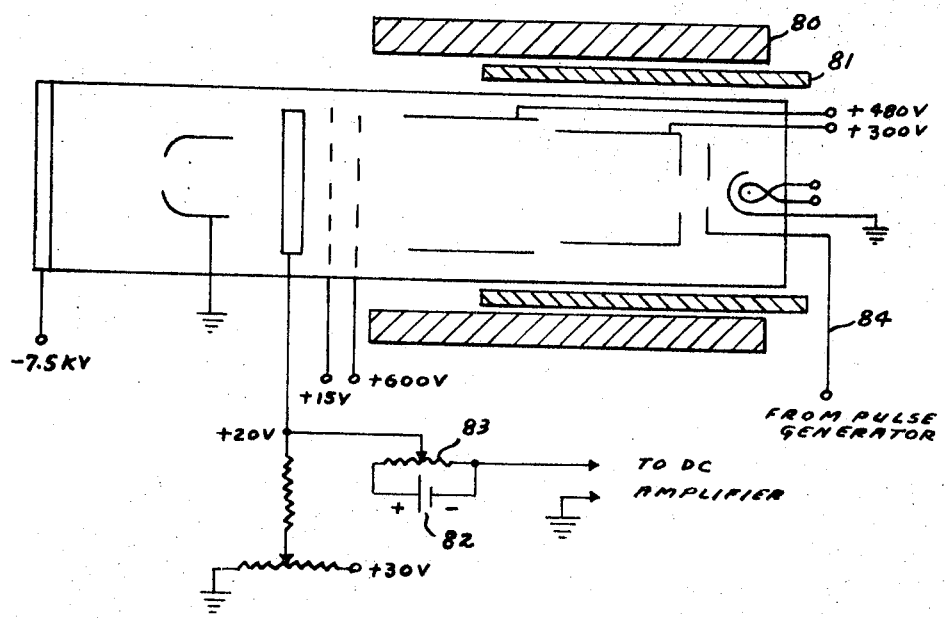
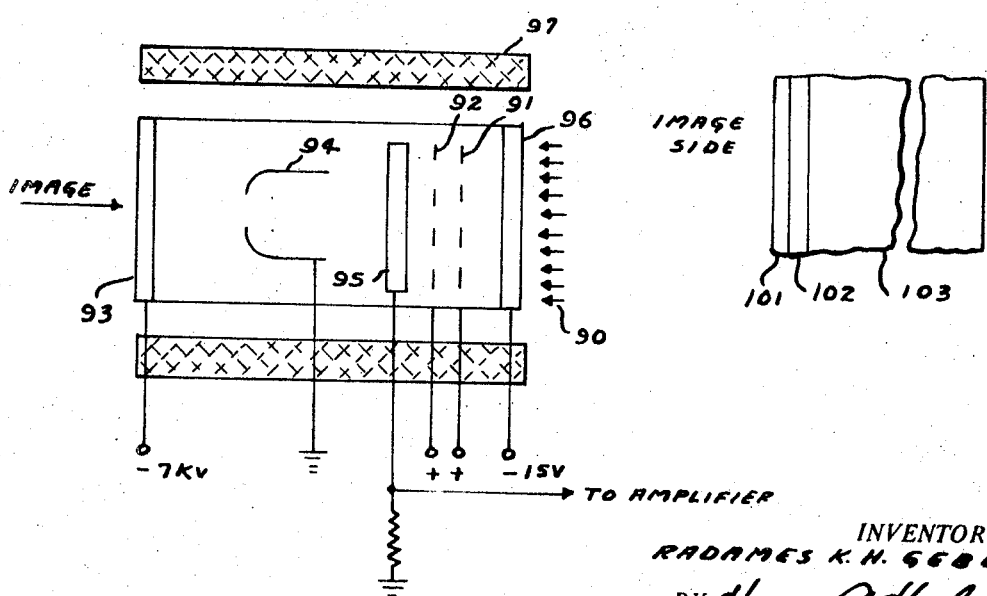

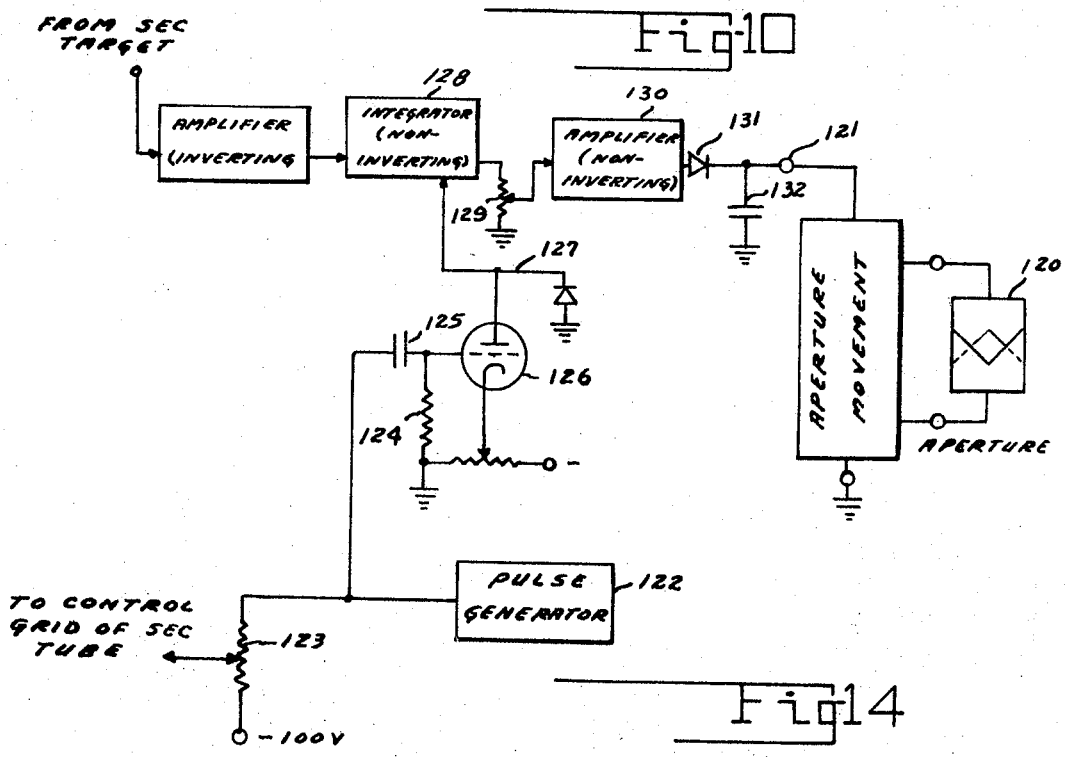
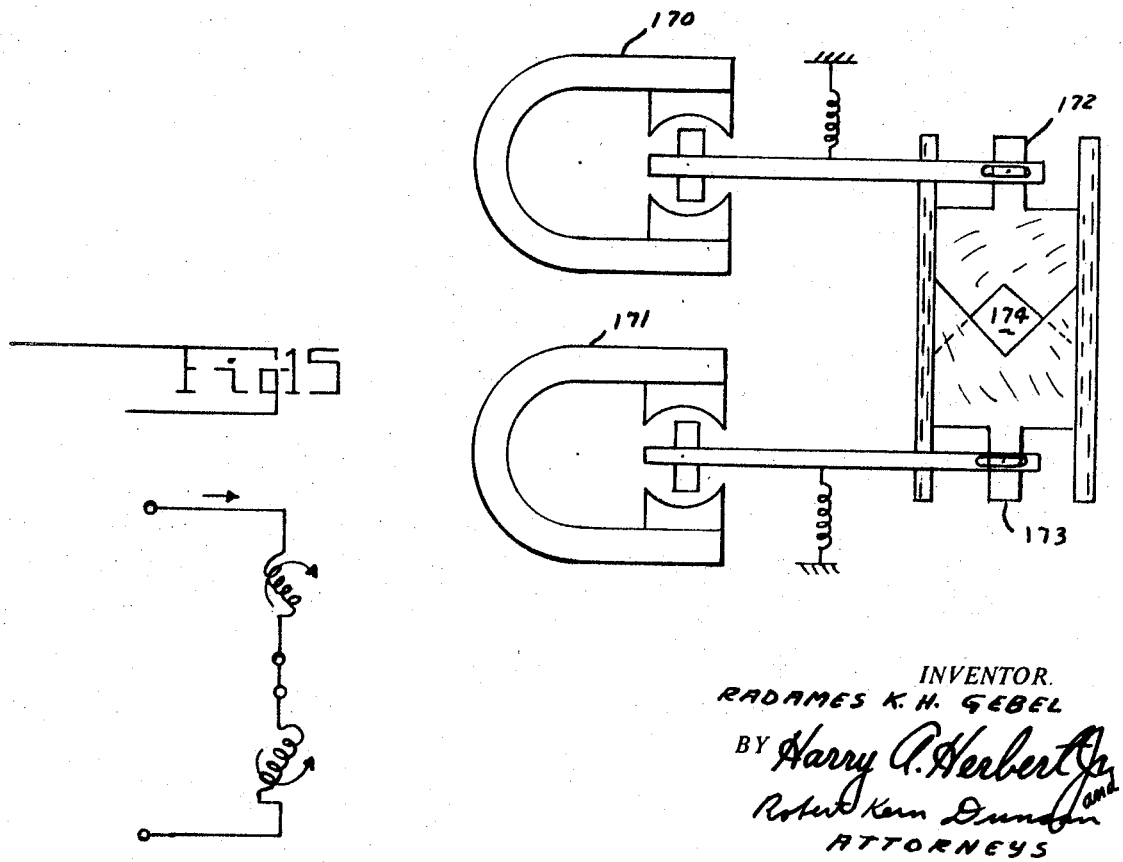
INVENTOR.
RADAMES K. H. GEBEL
BY Harry A. Herbert Jr
Robert Kern Duncan and
ATTORNEYS

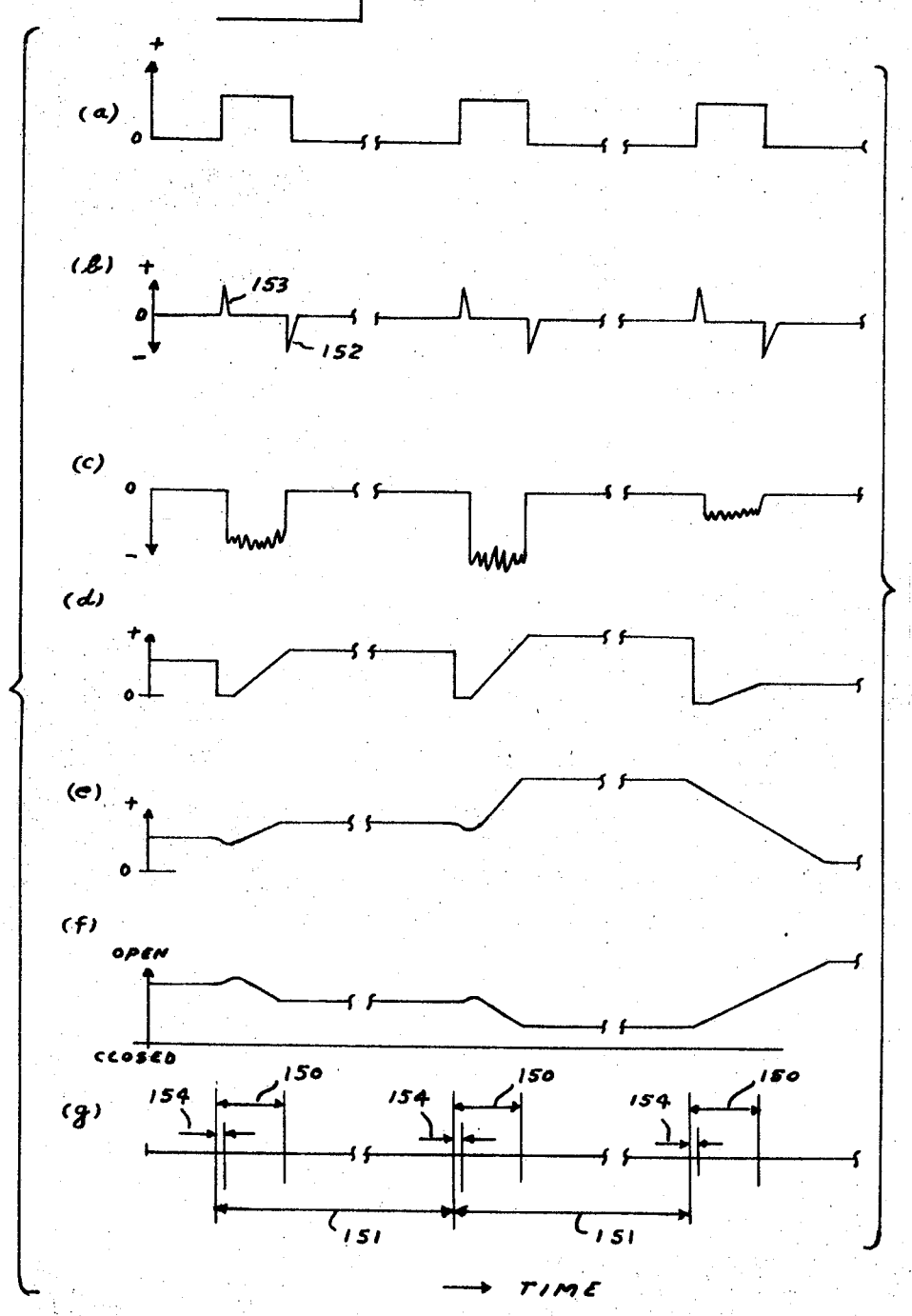

INVENTOR.
RADAMES K.H. GEBEL
BY Harry A. Herbert Jr
Robert Kern Duncan
ATTORNEYS

LIGHT CONTROL SYSTEM FOR USE IN VERY LOW LIGHT INTENSITIES

BACKGROUND OF THE INVENTION

The field of the invention is in light intensity control systems for photographic devices.

Automatic light control devices for controlling normal light intensities entering photographic equipment are well known. The widely used "automatic" cameras having "electric-eye" photocells that detect the light intensity and control the aperture, and in some instances also the shutter speed, are in universal use. More sophisticated light sensing devices utilizing photomultiplier tubes as light detectors in aperture control systems are also known and in usage in many special applications.

With the advent of extremely sensitive photographic film, and very high sensitivity television type camera tubes, and particularly when these devices are coupled to high gain image intensifier tubes, it is now possible to obtain continuous (moving) pictures at night. However, it is just as important, and necessary, to maintain relatively constant light intensity to photographic transducers operating at low levels of light intensities as it is for those operating under normal light intensities since the range of usable light intensities that can be accommodated is essentially still limited to a relatively narrow range. In typical low level imaging, the range of scene brightness between dawn or dusk and midnight is a ratio of about $10^7$ to one. None of the previously known light control devices have the sensitivity to be suitable for automatically controlling the light intensity for continuous photography, at the low levels of illumination at which it is now possible to transduce an optical image to a photographic picture on film or to an electrical signal for transmission.

SUMMARY OF THE INVENTION

The invention comprises a high sensitivity automatic light exposure control system for use with low light level (nighttime) motion cameras.

BRIEF DESCRIPTION OF THE DRAWING

FIG. 7 is a schematic diagram of an electron beam read SEC storage light detector tube;

FIG. 8 is a schematic diagram of an optically read SEC storage light detector tube;

FIG. 9 is a representative pictorial view across the thickness of a typical SEC target;

FIG. 10 is a block-schematic diagram of a typical electronic circuit for use with the electron beam scanned SEC light storage detector, shown controlling a mechanical aperture;

FIG. 11 is a plot of typical representative electronic waveforms associated with the operation of the circuit shown in FIG. 10;

FIG. 14 is a pictorial representation of a typical mechanical aperture and movement;

FIG. 15 is a schematic representation of the electronic circuitry of the movement shown in FIG. 14;

DESCRIPTION OF THE PREFERRED EMBODIMENTS

Figure 1:
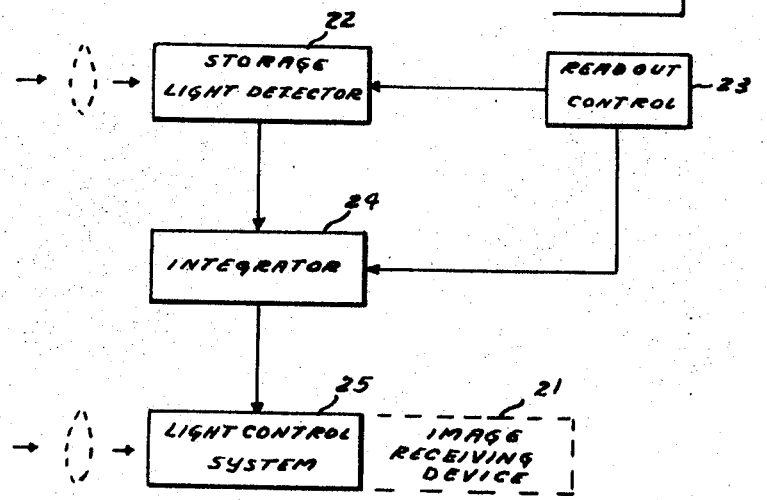
FIG. 1 is a simplified block diagram of the invention.

The invention is represented in simplified block form in FIG. 1. The image receiving device 21 may be any of the well known systems suitable for taking moving pictures in low light levels (after dark). Generally they comprise either a television type camera or a photographic camera coupled to one or more image intensifiers. The invention achieves high sensitivity to the very low light levels by the use of a storage light detector 22 that integrates temporally the light intensity from the scene viewed, which is the same scene as received by the image receiving device. The period of time over which the storage light detector integrates is a finite, determined, interval provided by the readout control 23. The readout control provides periodic pulses which cause the storage light detector to provide a signal during each pulse representative of the temporally integrated light intensity of the scene viewed over the period between the periodic readout pulses to the integrator 24. The integrator 24 further integrates the signal from the storage light detector over the readout time and provides a relatively constant electrical signal between readouts that is representative of the temporally and spatially integrated light intensity of the scene during the prior period. This signal actuates the control system 25 which maintains relatively effective constant light intensity to the image receiving device 21 with changing scene intensities. The readout control 23 also zeros the integrator 24 just prior to each readout signal from the light storage detector 22, so that an effective value of scene intensity is obtained each readout time and that value is maintained to the light control system 25 until the next readout. It will be well understood that for instances of rapidly changing scene intensities that the period between readout signals should be short in duration, and that maximum sensitivities to very low light intensities will best be obtained with long integration periods of time between readout values. It has been found that periods of approximately 1 second between readouts which are of the order of a millisecond, or slightly more, are suitable for general usage of the invention. Those skilled in the art will readily understand how to vary these operating parameters to suit a particular specific condition.

Figure 2:
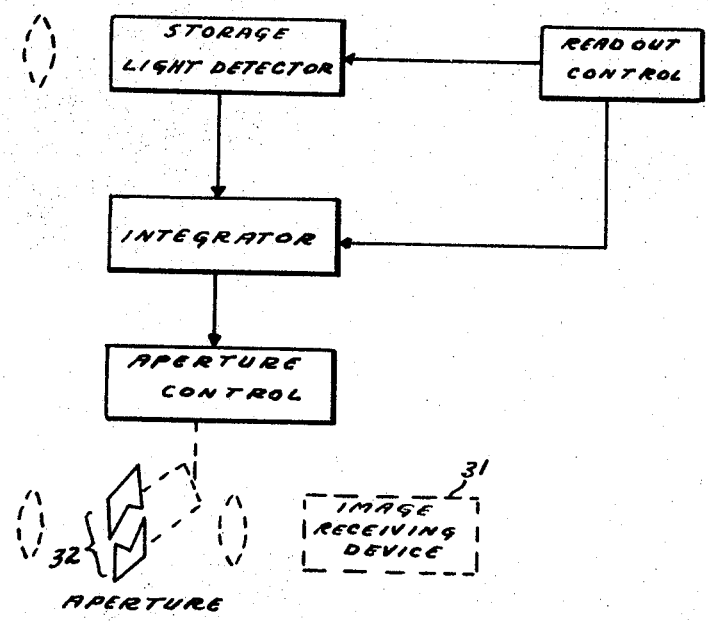
FIG. 2 is a simplified block diagram of an embodiment of the invention having a controlled mechanical aperture.

An embodiment of the invention wherein the light entering the image receiving device is controlled by an electrically operated mechanical aperture is shown in FIG. 2. The lowest value of usable light intensity is determined by the particular conventional image receiving device used. The apparatus of the invention places the aperture 32 in the wide open position for this value of light and at higher values of light intensity the invention correspondingly stops down (closes) the aperture so that the light intensity passed to the image receiving device is maintained essentially constant with changing values of scene intensity.

Figure 3:
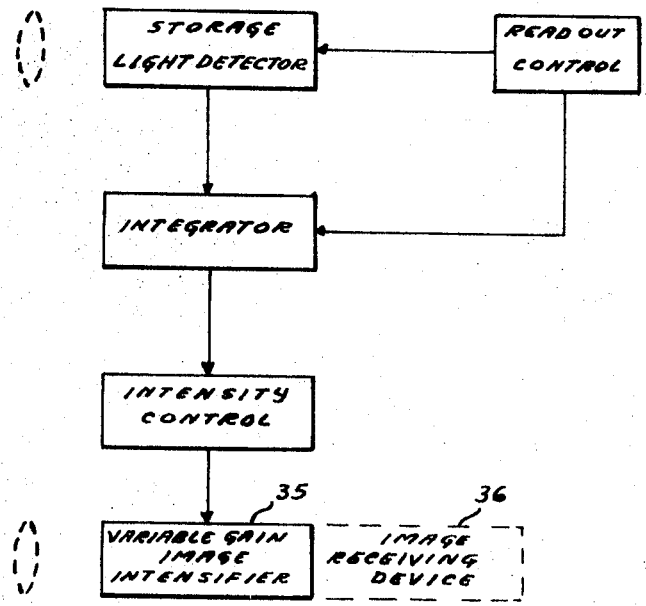
FIG. 3 is a simplified block diagram of an embodiment of the invention having a controlled variable gain image intensifier.

Another embodiment of the invention, shown in FIG. 3, uses a variable gain image intensifier 35 for controlling the light entering the image receiving device. As with other embodiments of the invention, the image receiving device 36 may be a sensitive photographic moving camera or an electronic (television) camera, either may be preceded by one or more stages of fixed gain image intensification.

Figure 4:
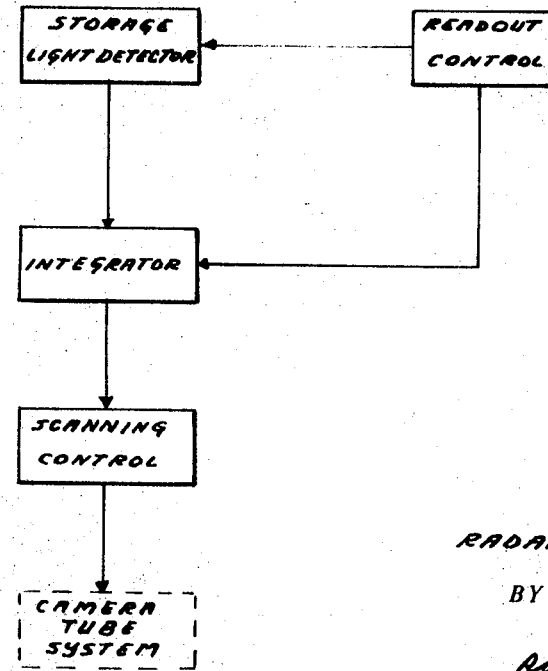
FIG. 4 is a simplified block diagram of the invention controlling the scanning frame time of a camera pickup tube.

Another embodiment of the invention for controlling the frame time of electronic cameras is shown in FIG. 4. It is well understood that under higher levels of illumination the number of frames taken per second can be increased and thus the effective light per frame is decreased. In this embodiment by controlling the electronic scanning of the camera tube in accordance with the light intensity the electrical signal output of the camera tube is maintained relatively constant with changing amounts of scene illumination.

It is to be observed that the differences in the three embodiments of FIGS. 2, 3, and 4 reside in the light control systems used with the image receiving devices. These light control systems will be described further after considering two embodiments of apparatus shown in block diagrammatical form in FIGS. 5 and 6 that may be used to actuate the light control systems.

Two well known types of storage light detectors are, electron beam read Secondary Electron Conduction (SEC) tubes and optically read SEC tubes. A relatively early discussion of these tubes and their operation may be found in the text "Advances in Electronics and Electron Physics" published in 1966 by Academic Press, commencing at pages 241 and 273.

Figure 5:
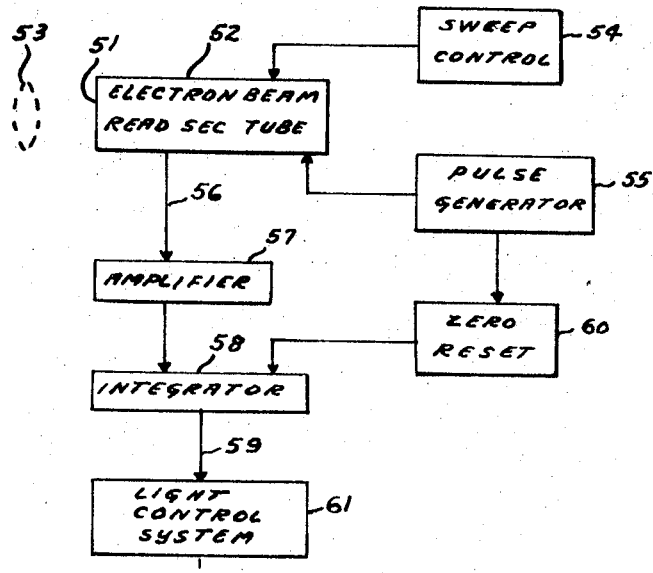
FIG. 5 is a simplified block diagram of an embodiment of the invention having an electron beam read Secondary Electron Conduction (SEC) storage light detector tube.

A block diagram of an embodiment of the invention using an electron beam scanned, for readout, SEC tube is shown in FIG. 5. Essentially the same image as is received by the image receiver is focused on the photocathode 51 of the electron beam read SEC tube 52 by conventional lens system 53. The image is stored on the target of the tube until the target is swept with an electron beam which provides a readout signal from the target proportional to the integrated light intensity over the period since the last readout. The sweep control circuit 54 provides the horizontal and vertical sweep currents for deflecting the electron beam over the target. These circuits are well known and extensively used in television and other similar apparatus and need not be further described. Interlacing scanning need not be used. Frame times of approximately 1/30 to 1/60 second have been found to be satisfactory. Frame time is not critical. Slight defocusing of the electron beam may be employed, and has been found to be generally desirable in order to obtain complete coverage of the swept area.

The pulse generator 55 turns the electron beam on to provide the readout. It provides a pulse of approximately 15 millisecond so that one scan (frame) of the target is provided. Again this figure is not critical and those skilled in the art will readily know that longer pulses are required with slower scanning sweeps and that shorter pulses may be used with faster sweeps so that in each instance all the stored light intensity information is taken from the target of the SEC tube each readout. For general usage a period of approximately 1 second between pulse onsets has been found very satisfactory. Thus, the output signals 56 from the target of the SEC tube during readout contain the light intensities from the scene integrated over the storage time. These signals are amplified in conventional amplifier 57 and further integrated over the readout time by conventional integrator 58 so that the output 59 is a voltage representative of the light intensity from the viewed scene integrated both spatially and temporally. The integrator 58 is reset by the zero reset circuit 60 at the beginning of the readout pulse of each period. Thus the signal 59 to the light control system 61 is adjusted each period to the integrated light intensity from the scene from the previous period. The light control system then controls the aperture, or other means as previously discussed, so that the effective value of light intensity utilized by the image received is maintained relatively constant with changing values of scene intensity.

Figure 6:
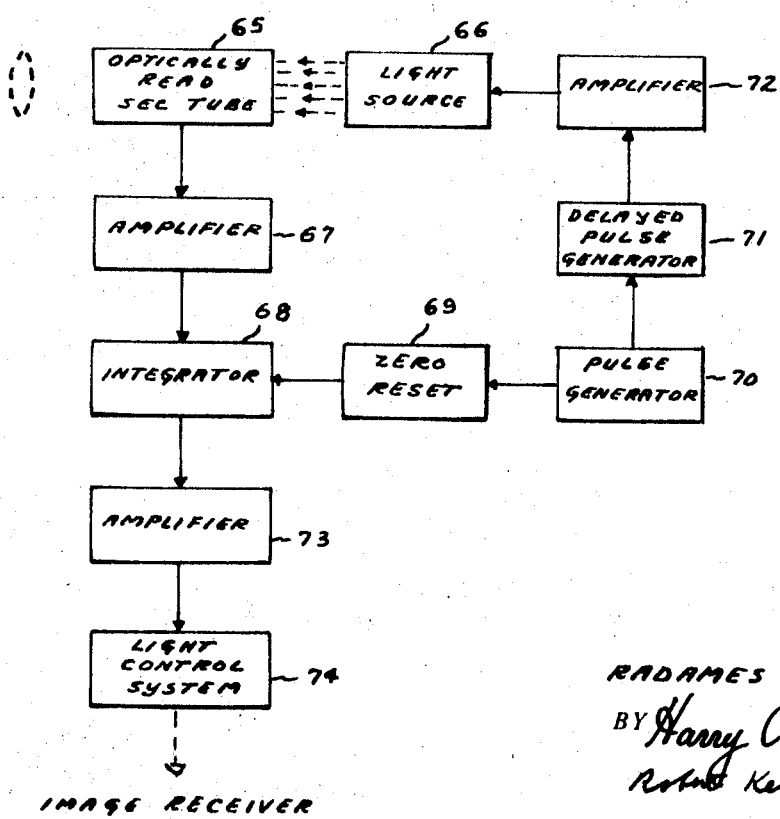
FIG. 6 is a simplified block diagram of an embodiment of the invention having an optically read SEC storage light detector tube.

In the embodiment shown in FIG. 6 an optically read SEC tube is used as the storage light detector 65. In general usage optically read SEC tubes are scanned for readout with a beam of light to provide a readout signal similar to that obtained from the electron beam read SEC. While this may be done in this invention to provide operation similar to that of the previously described embodiment, it is not necessary and a simplified device may be had by flooding the SEC "read" photocathode with a broad source of light such that the complete target area is essentially read out simultaneously. This provides a much faster readout, which is advantageous and in addition it essentially performs the spatial integration.

The light source 66 may be any of the well known relatively large area glow discharge tubes or smaller sources may be used with a lens system as is well known in the art. Generally incandescent light sources are not as desirable due to their delay in reaching and decaying from full incandescence. Approximately a 1 millisecond pulse of light on the "read" photocathode has been found suitable for reading out the target of an optically read SEC tube. As before, approximately 1 second has been found to be a generally suitable time period between readout pulses.

Amplifier 67 amplifies the signal from the optically read SEC tube 65 and couples the signal to the integrator 68. The amplifier should have relatively good high frequency response as the signal from the target of the SEC is generally considerably shorter in duration from the 1 millisecond flooding time. Small amounts of stretching of the readout signal by the amplifier has been found not to be detrimental to the overall operation of the system. The integrator 68 integrates the readout signal and holds the integrated value between readouts. The integrator is zeroed each period by the zero reset circuit 69. The pulse generator 70 generates timing pulses of approximately 1 millisecond duration over 1 second periods. These pulses are used directly through the reset circuit to reset the integrator. A delayed pulse generator 71 generates another approximately 1 millisecond pulse at the cessation of the first millisecond pulse. This delayed pulse is amplified in conventional amplifier 72 and the amplified pulse actuates the light source 66 for flooding the target of the SEC tube. Thus the integrator is returned to zero just prior to each readout. Conventional amplifier 73 amplifies the output of the integrator and actuates the light control system 74.

A schematic diagram of a typical electron beam read SEC tube as may be used with the embodiments of FIG. 5 is shown in FIG. 7. Tube types such as the WX-30654 and the WX-30691 manufactured by Westinghouse are examples of electron beam read SEC tubes suitable for use with the invention. The operating potentials shown in FIG. 7 are typical for the type WX-30654 tube. They are given merely as an aid and not to be considered as limiting to the invention. The power supplies supplying the potential to the electrodes and the current for the focus-alignment coil 80 are conventional and not shown. The electron beam deflection yoke 81 is driven from the conventional sweep circuits 54 (FIG. 5) to sweep the beam in the vertical and horizontal directions. The normal operating potential of the target electrode in this particular SEC tube is approximately +20 volts. If the signal amplifier used with the SEC tube contains provision for removing a DC offset voltage, the battery 82, and potentiometer 83 used to cancel the normal quiescent DC target potential so that the amplifier has zero DC input with zero signal, are not needed. The pulse from the signal generator raises the potential on line 84, connected with the control grid of the SEC tube, from bean cutoff to beam conduction so that the target is scanned by the beam and an output signal produced. The scanning circuits may run continuously and any particular synchronization of the frame sweep with the timing pulse turning the beam on is not necessary.

The optical SEC tube shown in FIG. 8 functions in a similar manner to the electron beam scanned tube except that the complete target of the SEC tube is simultaneously read out by a single flooding light source 90. It may be optically scanned by a moving pencil of light to provide an output signal like the electron beam scanned tube, however, this adds unnecessary complications and is generally undesirable. This type SEC tube has the advantage of eliminating the beam deflection coils and all the apparatus associated with the electron gun. The normal operating potentials of the suppressor mesh 91, the field mesh 92, the "write" (image) photocathode 93, and the anode 94 are similar to those used with the electron beam scanned SEC tube. The target electrode 95 may be at ground potential or slightly above depending upon the particular optical SEC tube used. The flooding photocathode 96 operates best at a slightly negative potential. Conventional photocathodes are used in SEC tubes and those practicing this invention will readily choose any of the well known photocathodes to suit a particular application. Magnet 97 focuses the electrons from the photocathodes onto the target 95. In a particular embodiment a permanent magnet having approximately a 700 gauss axial magnetic field provided satisfactory operation of the tube. The Westinghouse type WX-30768 is an example of a suitable optical SEC tube.

A section of the cross section of a typical target electrode is shown in FIG. 9. It consists of a supporting member 101 of aluminum oxide $Al_2O_3$) approximately 0.05 micron thick (facing the image photocathode), followed by an approximately 0.05 micron thick layer of aluminum 102, which forms the signal electrode. Deposited on the aluminum is a highly porous layer of potassium chloride (KCl) 103 having a density of approximately 1 to 2 percent and a thickness of approximately 20 microns.

FIG. 10 is a more detailed block-schematic diagram of the electronic circuits of an embodiment of the invention using an electron beam read SEC tube such as shown in block diagram form in FIG. 5. FIG. 10 shows a mechanical light regulating aperture 120 actuated by the electrical output at terminal 121. It is to be understood that the signal at terminal 121 may also be used to actuate other light controlling elements. The operation of the apparatus of FIG. 10 as associated with the embodiment of the invention of FIG. 5 may best be understood when contemplated with the typical idealized waveforms shown in FIG. 11. All of the waveforms are plotted to a common time base. The particular timing intervals are not critical, as previously explained, and are set forth specifically only to aid in understanding the invention. The values to be enumerated have been found to be suitable in the general utilization of the invention. The conventional pulse generator 122 generates periodic pulses as shown in FIG. 11a having pulse lengths 150 of approximately 15 milliseconds at approximately 1 second intervals 151 as shown on the time scale of FIG. 11g. These pulses, through potentiometer 123, raise the control grid of the SEC tube to conduction from cutoff and the readout electron beam sweeps the target electrode for the duration of the pulse. The pulse is also differentiated by the RC circuit comprising resistance 124 and capacitance 125 providing at the grid of tube 126 the waveform shown in FIG. 11b. Tube 126 is biased to cutoff thus the negatively going pulse 152 has no effect. The positive going pulse 153 has a duration 154 of approximately 1 millisecond and drives the tube 126 of the zero reset circuit into conduction reducing the potential on line 127 to ground resetting the output of the integrator 128 to zero.

Assuming for the benefit of explanation, that the scene illumination intensity changes from a medium value to a high value and then to a low value over the time intervals shown in FIG. 11, the output from the target of the SEC tube may be represented by the waveform shown in FIG. 11c. No attempt has been made to represent every sweep in the Figure. The mere fact that the signal level may, and usually will, vary as the beam sweeps the target is portrayed. FIG. 11d represents the output from the integrator with the input signals shown. It is to be observed that the output of the integrator is returned to zero at the start of each readout signal. When the sweep is made to just cover the target reception area the signal from a few sweeps will be missed during the zeroing. This may readily be overcome by adjusting the sweep deflection so that the sweep will be outside the target reception area during the aeroing and then progress onto the active target area just after the zeroing time. The details of this will not be gone into further since they are well known and in common practice in television technique.

The device is calibrated by adjusting potentiometer 129 so that in the embodiment shown in FIG. 10 a given light intensity will produce a determined opening of the aperture 120. Obviously, other gain controls may be employed in the apparatus, as those skilled in the art understand. Likewise, the amounts of amplification used throughout the circuit depends upon the particular gains and losses of the components used, and the device is calibrated to match the "speed" of the film used or the sensitivity of the camera tube taking into consideration the gain of any image intensifiers used with the image receiver. All this is common practice with daylight photography and needs no further explanation.

Amplifier 130 further amplifies the output of the integrator sufficiently to actuate the light control means used. Diode 131 enables the holding circuit comprised of capacitance 132 and the impedance of the light control system to smooth the output of the integrator so that the light control systems do not have to go from one extreme position for each readout. Thus, with the system shown in FIG. 10 the voltage at terminal 121 is represented by the waveform of FIG. 11e. The polarities of the waveforms shown in FIG. 11 correspond to the block-schematic diagram shown in FIG. 10 so that the principles of operation may readily be comprehended. It is to be understood, however, that the polarity of the signal progressing through the circuit is critical only to the extent that an increase in scene intensity will cause an effective decrease in the light intensity of the image receiving device.

An example of an aperture control is shown in FIG. 14. Two conventional meter movements 170 and 171 connected in series and having reverse directions of motion as shown in FIG. 15 actuate two conventional "V" plate aperture leaves 172 and 173 such that the opening 174 through which light is passed to the image receiver is reduced with increasing amounts of electrical signal. Thus with very low levels of light intensity the aperture is essentially wide open and with relatively high levels of intensity it is stopped down to a small opening. This is represented by the graph of FIG. 11f for the representative signals shown.

Figure 12:
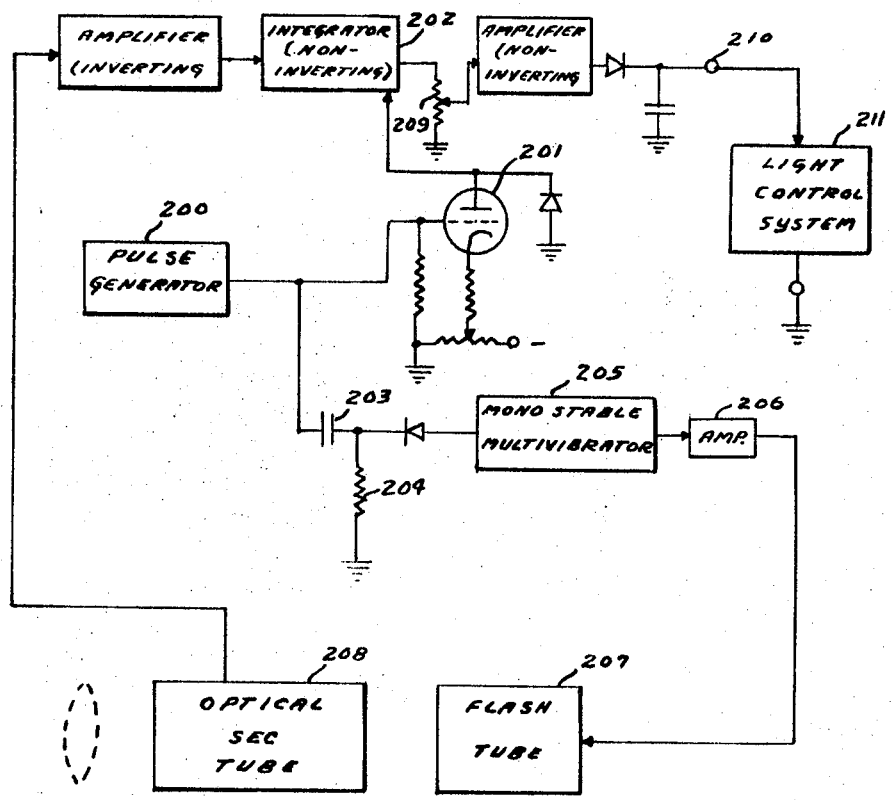
FIG. 12 is a block-schematic diagram of a typical electronic circuit for use with the optically read SEC light storage detector.
Figure 13:
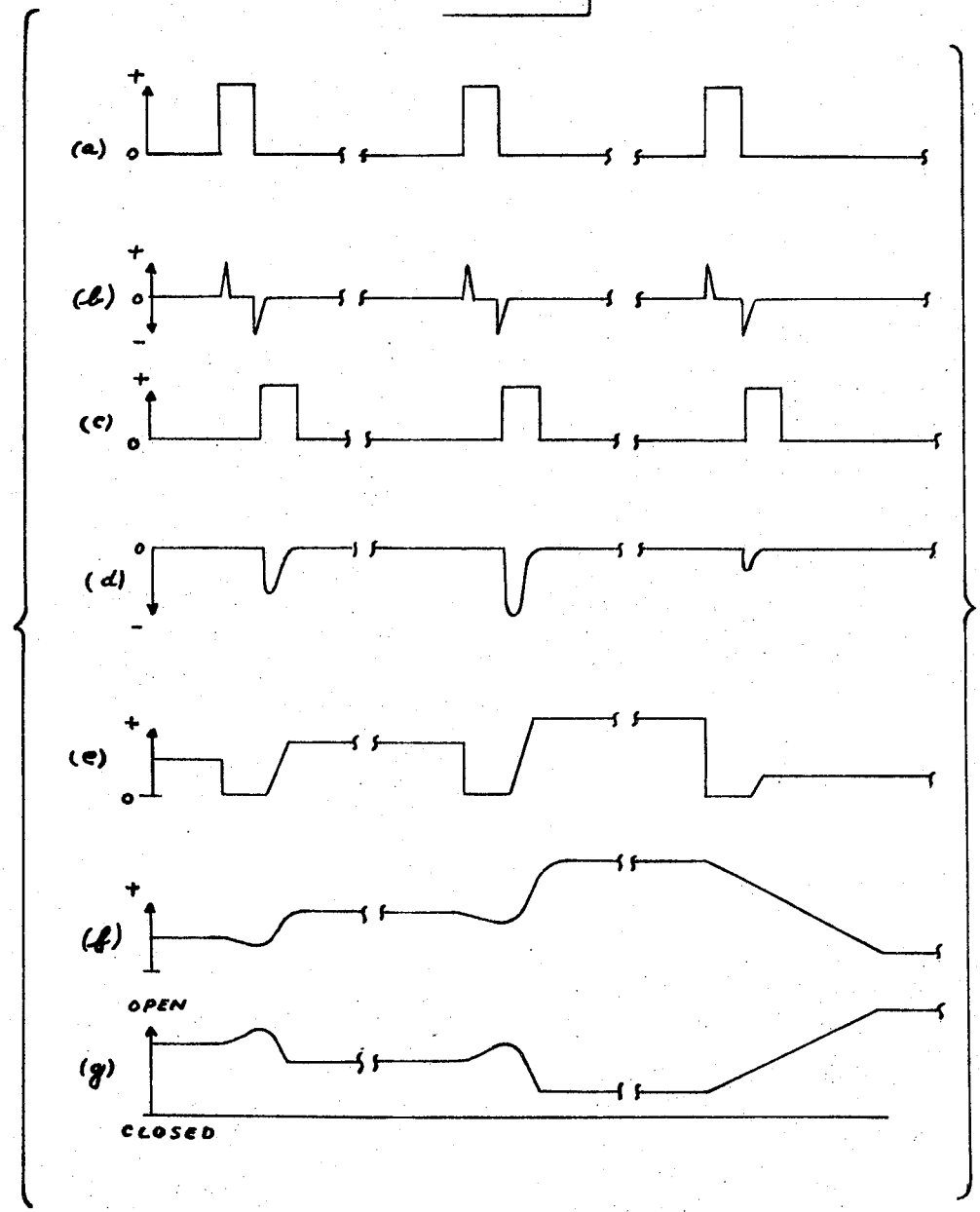
FIG. 13 is a plot of typical representative waveforms associated with the circuit shown in FIG. 12.

FIG. 12 is a block-schematic diagram showing additional detail of an example of circuitry that may be used in the embodiment utilizing an optical SEC tube as shown in block form in FIG. 6. The operation of the circuit may best be understood when considered with the typical idealized waveforms shown in FIG. 13. The following increments of time are given for illustrative purposes. They are not critical to the operation of the invention, but have merely been found to be suitable in general applications. The conventional pulse generator 200 generates approximately 1 millisecond pulses periodically over approximately 1 second periods as represented by the waveform of FIG. 13a. These pulses through the zero reset circuitry comprising tube 201 and the associated circuitry reset the integrator 202 to zero for each readout. The pulses are also differentiated in the RC differentiator comprising capacitance 203 and resistance 204 providing the waveform shown in FIG. 13b. The differentiated pulses from the trailing edge is used to drive the conventional monostable multivibrator pulse generator 205. The monostable multivibrator produces a delayed pulse of approximately 1 millisecond duration essentially immediately following the first 1 millisecond pulse and is represented by the waveform of FIG. 13c.

The output of the delayed pulse generator 205 is amplified by amplifier 206 sufficiently to fire the conventional flash tube light source 207. The flash tube floods the photocathode (96, FIG. 8) of the optical SEC tube 208 which in turn floods (with electrons) the target of the SEC tube to provide an output signal from the target of the SEC tube. The output signal from the SEC tube is essentially a single pulse for each readout having an area representative of the light intensity of the scene for the previous period. This may be represented by the waveform shown on FIG. 13d for moderate, high, and low relative light intensities, respectfully. The output of the integrator is represented by FIG. 11e. The system is calibrated by potentiometer 209 and a smoothed output at terminal 210, as represented by FIG. 11f, is provided to the light control system 211, which may be the mechanical aperture arrangement previously described, in which case the aperture opening would be controlled as represented by FIG. 13g.

Figure 17:
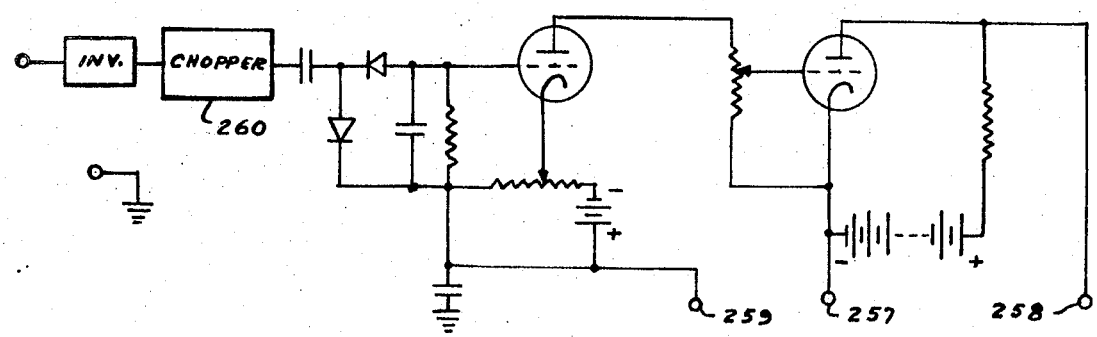
FIG. 17 is a block-schematic diagram of a typical circuit for controlling the gain of the variable gain image intensifier tube shown in FIG. 16.
Figure 16:
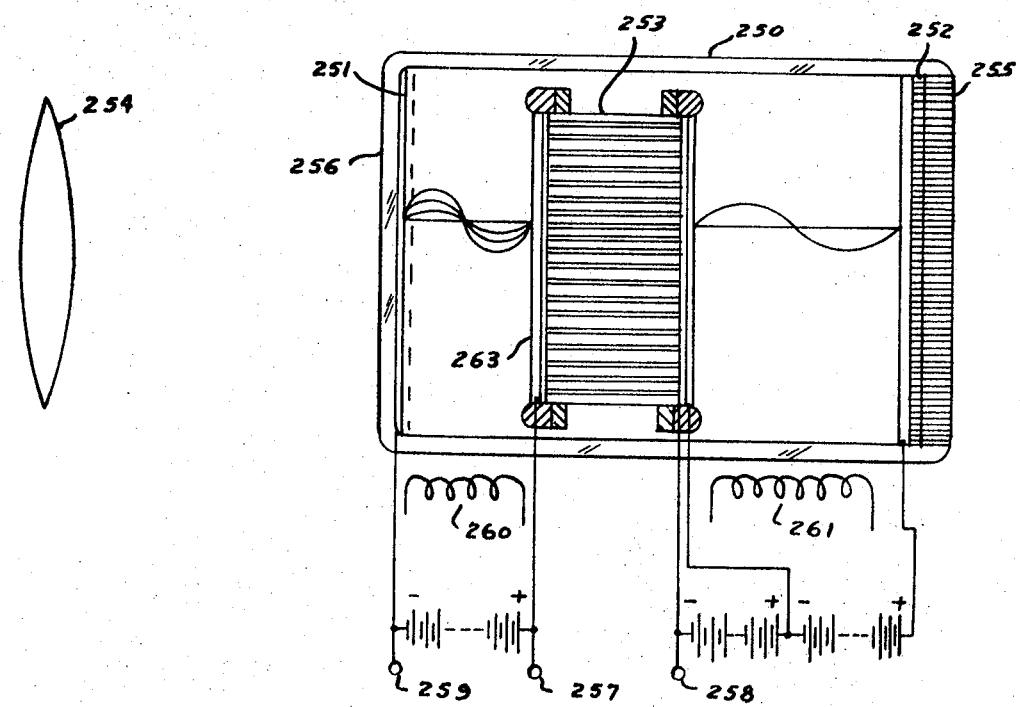
FIG. 16 is a schematic representation of a typical variable gain image intensifier tube as used in the embodiment shown in FIG. 3.

The variable gain image intensifier shown in FIG. 16 with the associated electronic circuit of FIG. 17 comprises another suitable light control system. Typical variable gain image intensifier tubes 250 provide an image-intensity gain from the photocathode 251 to the phosphor 252 from approximately 200 to 10,000 depending upon the potential applied across the microchannel image amplifier 253. It is to be observed that this gain change of approximately 50 to 1 corresponds very closely to the ratio of gain change in the conventional daylight camera aperture stops in going from an F2.8 to F22 which effects a light intensity change of about 64. When the variable gain image intensifier 250 is used alone, the optical image from the scene is focused on the photocathode 251 in the conventional manner by the optical lens system represented by the single lens 254. The variable gain image intensifier is optically coupled to the camera (film or electronic) by the fiber optic output plate 255. When higher values of light amplification are desired, the variable gain intensifier 250 may be followed or preceded, or both, by other fixed gain image intensifiers or an additional variable gain image intensifier actuated from the same control voltage. When it is preceded by other stages of intensification, it is generally preferable that the front plate 256 be a fiber optic element.

By varying the potential across terminals 257 and 258 from approximately 100 volts to approximately 3 kilovolts the gain through the micro channel amplifier can be varied from approximately unity to a few hundred. Coils 260 and 261 are conventional focus coils for the electron beams. The variable gain image intensifier tube shown schematically (not to scale) in FIG. 16 employs magnetic focusing of the preamplifier section (ahead of the micro channel section) and also of the postamplifier section (following the micro channel section). Tubes using proximity focusing may be used, and they have the advantage of a much shorter physical length and require no magnetic field for focusing.

A typical electronic circuit for controlling the voltage across a micro channel amplifier in accord with the output at terminal 121 of FIG. 10 or terminal 210 of FIG. 12 is shown in FIG. 17. A conventional chopper 260 is used to isolate the control potential across the micro channel image amplifier from the ground of the system. It is generally desirable to place the potential of the phosphor 252 of the variable gain image intensifier at the system ground potential and this may be done with the circuit shown in FIG. 17. If the terminal 257 is placed at ground potential the chopper isolation is not needed but when this is done it places a voltage stress of approximately 20 kv across the fiber optic output plate 255.

Figure 18:
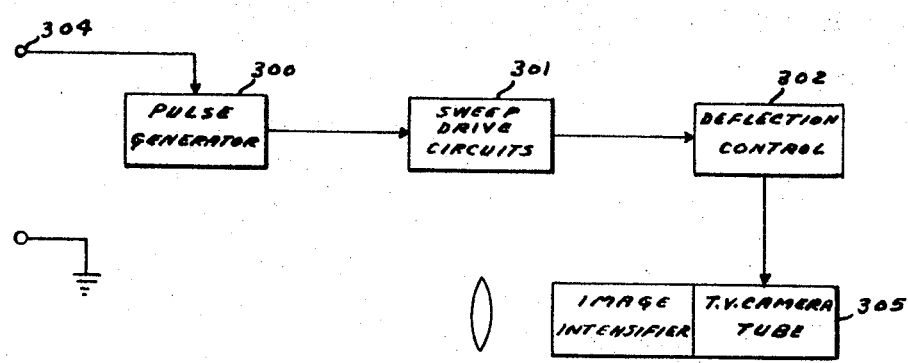
FIG. 18 is a simplified block diagram further detailing the frame time control circuitry of the embodiment of the invention shown in FIG. 4.

FIG. 18 shows in block form a typical light control system for varying the frame time of an electronic camera. The light control system may comprise the pulse generator 300, the sweep drive circuits 301, and the deflection control 302 as shown. In this system the control voltage at terminal 121 of FIG. 10, or a similar voltage from terminal 210 of FIG. 12 is applied at the input terminal 304 of the pulse generator and through the control circuitry controls the frame time of the camera tube 305. These circuits are well known and widely used.

I claim:

1. Automatic light control apparatus for use in very low light intensities for controlling the effective light intensity from a scene viewed by an image receiving device comprising:
   a. an electron beam read Secondary Electron Conduction tube for storing the light intensity from the scene viewed;
   b. means cooperating with the electron beam read Secondary Electron Conduction tube for providing a readout signal of the stored light intensity at predetermined periodic time intervals;
   c. an integrator for integrating the said readout signal and providing an output signal responsive to the integrated light intensity for each readout period; and
   d. means cooperating with the said image receiving device responsive to the said output signal of the integrator for controlling the effective light intensity from the scene viewed by the image receiving device.

2. The apparatus as claimed in claim 1 wherein the said means cooperating with the said image receiving device responsive to the said output signal of the integrator for controlling the effective light intensity from the scene viewed by the image receiving device includes a mechanical aperture.

3. The apparatus as claimed in claim 1 wherein the said means cooperating with the said image receiving device responsive to the said output signal of the integrator for controlling the effective light intensity from the scene viewed by the image receiving device includes a variable gain image intensifier.

4. The apparatus as claimed in claim 1 wherein the said means cooperating with the said image receiving device responsive to the said output signal of the integrator for controlling the effective light intensity from the scene viewed by the image receiving device is a means for varying the scanning frame time of the image receiving device responsive to the light intensity of the scene viewed.

5. Automatic light control apparatus for use in very low light intensities for controlling the effective light intensity from a scene viewed by an image receiving device comprising:
   a. an optically read Secondary Electron Conduction tube for storing the light intensity from the scene viewed;
   b. means cooperating with the optically read Secondary Electron Conduction tube for providing a readout signal of the stored light intensity at predetermined periodic time intervals;
   c. an integrator for integrating the said readout signal and providing an output signal responsive to the integrated light intensity for each readout period; and
   d. means cooperating with the said image receiving device responsive to the said output signal of the integrator for controlling the effective light intensity from the scene viewed by the image receiving device.

6. The apparatus as claimed in claim 5 wherein the said means cooperating with the said image receiving device responsive to the said output signal of the integrator for controlling the effective light intensity from the scene viewed by the image receiving device includes a mechanical aperture.

7. The apparatus as claimed in claim 5 wherein the said means cooperating with the said image receiving device responsive to the said output signal of the integrator for controlling the effective light intensity from the scene viewed by the image receiving device includes a variable gain image intensifier.

8. The apparatus as claimed in claim 5 wherein the said means cooperating with the said image receiving device responsive to the said output signal of the integrator for controlling the effective light intensity from the scene viewed by the image receiving device is a means for varying the scanning frame time of the image receiving device responsive to the light intensity of the scene viewed.

* * * * *